May 17, 1927.
C. E. LUCKE
INTERNAL COMBUSTION ENGINE
Filed July 25, 1924
1,629,111
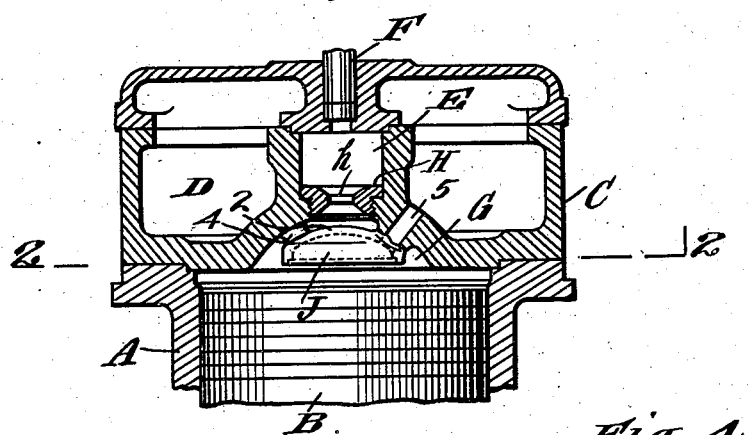
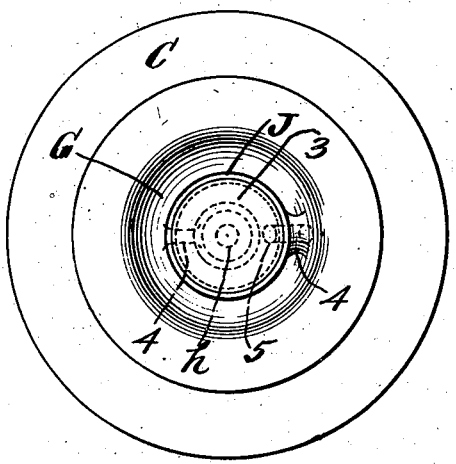
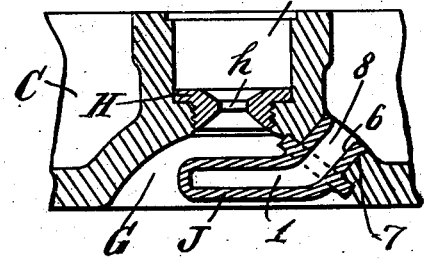
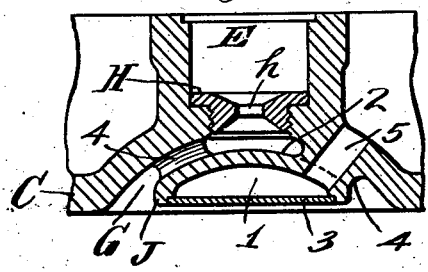
Inventor
Charles E. Lucke
By his Attorneys Patented May 17, 1927.

1,629,111

UNITED STATES PATENT OFFICE.

CHARLES E. LUCKE, OF NEW YORK, N. Y., ASSIGNOR TO WORTHINGTON PUMP AND MACHINERY CORPORATION, OF NEW YORK, N. Y., A CORPORATION OF VIRGINIA.

INTERNAL-COMBUSTION ENGINE.

Application filed July 25, 1924. Serial No. 728,101.

This invention relates to improvements in internal combustion engines and particularly to solid injection engines of the Diesel or constant pressure type.

The especial object of the invention is to provide efficient, reliable and durable means for breaking up and spreading the fuel as it is fed to the cylinder and thus securing better combustion action and avoiding the effects of local heating on the piston head.

For a full understanding of the invention, a description of constructions embodying the invention in the best forms now known to me, will now be given in connection with the accompanying drawings forming a part of this specification, and the features forming the invention then specifically pointed out in the claims.

In the drawings—

Figure 1 is a central section through the upper end of an internal combustion engine of well known form with the preferred form of the invention;

Figure 2 is a reversed plan of the cylinder head on the line 2—2 of Fig. 1;

Figure 3 is a view similar to Fig. 1, with the cylinder in section, and

Figure 4 is a view similar to Fig. 3, showing a modification.

Referring to the drawings and particularly to Fig. 1, A is the engine cylinder, B the piston and C the cylinder head provided with cooling or water jacket D. The engine shown is of the type well known as a pre-combustion chamber engine and E is the precombustion chamber formed in the cylinder head C, and F the oil injection nozzle through which the oil is forced by a suitable pump. Below the precombustion chamber E there is formed in the cylinder head C a hemispherical or dome-shaped combustion chamber G centrally arranged relatively to the restricted opening $h$ from the precombustion chamber to the cylinder, which is shown as formed in a plug H removably secured in the cylinder head. The piston B in the uppermost position leaves but slight clearance between it and the cylinder head C around the chamber G, so that substantially all the air is compressed by the flat top of the piston into the chamber G. The construction thus far described is well known.

In accordance with the present invention a spreader J is mounted centrally within the dome-shaped combustion space G beneath the opening or orifice $h$ and with its center in line with the centers of the orifice $h$ and the fuel nozzle F. The spreader J, as shown in Figs. 1 to 3, is hollow to provide a cooling water chamber 1 therein, and preferably, as shown in Figs. 1 to 3, comprises an upper wall 2 convex on the top and shown as conforming generally to the shape of the combustion chamber G, and a lower plate 3 which extends across the open face of the wall 2 and preferably of comparatively thin metal for cooling effect next to the piston, and secured in any suitable manner, as by welding, within a suitable recess in the annular edge of wall 2 to form a water-tight joint therewith. The spreader J is suitably spaced from the wall of chamber G and preferably is supported thereon by being integral therewith or by a joint securing substantially an integral construction, without the use of screws, bolts or the like. Preferably and as shown in Figures 1 to 3, the spreader is supported by a plurality of ribs 4 cast integrally with the cylinder head C and the wall 2, one or more of these ribs being suitably drilled to provide passage 5 connecting the jacket D with the cooling chamber 1 for circulation of the cooling water.

In the modified form shown in Figure 4, the spreader J is circular with flat top and bottom walls and is formed in a single casting enclosing the cooling chamber 1. In this case the spreader J is supported by a neck 6 cast integrally therewith and preferably secured to the cylinder wall C by being expanded within a bore 7 therethrough, so as to form a substantially integral connection. A passage 8 through the neck 6 connects chamber 1 with the water jacket D.

The operation is as follows: When the piston B is at or near the upper end of its stroke after having compressed the air into chamber G and precombustion chamber E, the fuel is injected through nozzle F into the precombustion chamber E where a portion of the fuel ignites, forcing the remainder of the fuel through orifice $h$ into the combustion chamber G. Here the stream of fuel strikes the top of spreader J and is distributed thereby through the combustion chamber G and toward the edge of the piston B, thus breaking up and mixing the fuel and distributing it throughout the cylinder, so as to avoid local overheating of the piston head.

While it is preferable that all fastening devices, such as bolts, screws, rivets and the like which burn out or cause fracture of the piston or cylinder head, be eliminated, as is done in the constructions shown, and this forms a specific feature of the invention, it will be understood that the invention, broadly considered, is not limited to this feature. It will be understood, also, that the invention is not limited to the special type of engine shown having a precombustion chamber and special form of combustion chamber, but is applicable also to engines of other forms, including those in which the fuel is injected directly into a cylinder combustion chamber of cylindrical or other form, and the constructions shown may be otherwise modified within the invention as defined by the claims.

What is claimed is:

1. In an internal combustion engine, the combination with a precombustion chamber having a restricted opening to the cylinder and a fuel injector delivering fuel to the chamber, of a dome-shaped combustion chamber in the cylinder having its axis coincident with the restricted opening from the precombustion chamber and of less area in cross section than the cylinder, a fuel spreader in the dome-shaped chamber above the piston and in line with the fuel fed thereto, and means for cooling the spreader.

2. In an internal combustion engine, the combination with a precombustion chamber having a restricted opening to the cylinder and a fuel injector delivering fuel to the chamber, of a dome-shaped combustion chamber in the cylinder having its axis coincident with the restricted opening from the precombustion chamber and of less area in cross section than the cylinder, a fuel spreader in the dome-shaped chamber above the piston and in line with the fuel fed thereto, a cooling chamber within the spreader, and cooling liquid connections to said chamber.

3. In an internal combustion engine, the combination with a precombustion chamber having a restricted opening to the cylinder and a fuel injector delivering fuel to the chamber, of a combustion chamber within the cylinder head having its axis coincident with the restricted opening from the precombustion chamber and of less area in cross section than the cylinder, a fuel spreader in the combustion chamber above the piston and in line with the fuel fed thereto, and means for cooling the spreader.

In testimony whereof, I have hereunto set my hand.

CHARLES E. LUCKE